Patented Mar. 4, 1930

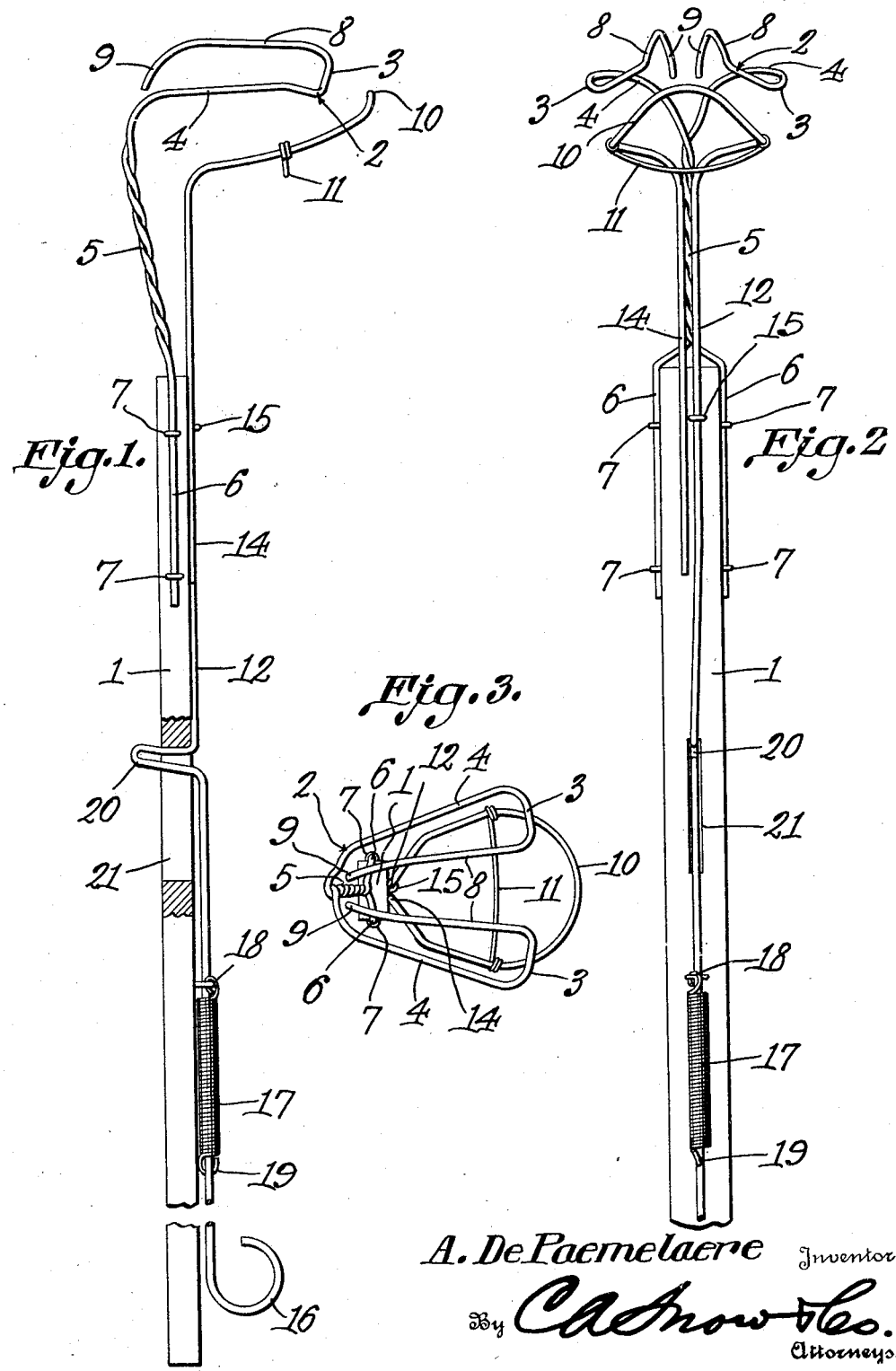

1,749,472

UNITED STATES PATENT OFFICE

ARTHUR DE PAEMELAERE, OF GARDENA, CALIFORNIA

EGG GATHERER

Application filed May 24, 1929. Serial No. 365,772.

This invention is adapted to be used for gathering eggs, or for any other purpose to which it may be put, and one object of the invention is so to construct the jaws that they will be resilient and not mash or crack the egg, the jaws, at the same time, having strength enough to hold the egg and keep it from dropping out of the device until the operator wishes to release the egg.

It is within the province of the disclosure to improve generally and to enhance the utility of devices of that sort to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed may be made, within the scope of what is claimed, without departing from the spirit of the invention.

In the drawings:—

Figure 1 shows in side elevation, a gatherer constructed in accordance with the invention, parts being broken away, and parts being in section;

Figure 2 is an elevation wherein the gatherer is viewed at right angles to the showing of Figure 1; and Figure 3 is a top plan.

The gatherer forming the subject matter of this application comprises a staff 1, which may be of any desired length. A fixed jaw 2 is provided and comprises cooperating loops 3, the outer side portions 4 of which are twisted together, as at 5, to form a shank, the shank ending in spaced fingers 6 which are connected to the sides of the staff in any desired way, such as by staples 7. The inner side portions 8 of the loops are free at their ends, and are resilient, the extremities 9 of the parts 8 of the loops 3 being turned toward the end of the staff 1. The fixed jaw is made of resilient material, such as wire, and because the inner side portions 8 are free at their ends, the jaw is rendered springy and resilient and will not crush an egg or similar object, the jaw, nevertheless, being strong enough to hold the egg or the like. Generally stated, the jaw 2 is concaved from side to side and from end to end.

The device includes a second jaw 10, which may be made of resilient wire. The second jaw 10 is loop-shaped, and its side portions are connected by a concaved tie 11, such as a light piece of wire, which aids in holding the object which is to be grasped.

The side portions of the second jaw 10 are continued to form arms 12—14 disposed at an angle to the jaw, the arm 12 being considerably longer than the arm 14. There is a guiding means, such as a staple 15, on the staff 1, and in this guiding means, the arm 12 slides. There is no corresponding guiding means for the arm 14, and the arm 14, as shown in Figure 2, is free. This construction enhances the resiliency of the second jaw 10. The arm 14, however, slides in contact with the staff 1, so as to steady the jaw 10. As disclosed in Figure 1, the jaw 10 extends upwardly in advance of the jaw 2, and this construction facilitates the picking up of the eggs or other objects which are to be held between the jaws 10 and 2.

On the lower end of the arm 12, there is a finger piece 16. One end of a retractile spring 17 is secured at 18 to the staff 1, and the opposite end of the retractile spring is connected at 19 to the arm 12. The spring 17 operates to carry the jaw 10 toward the jaw 2, and, consequently, the egg or other object can be held between the jaws. When the operator wishes to pick up or release an object, the jaw is pulled down by the instrumentality of the finger piece 16. The movement of the jaw 10 toward the jaw 2 is limited by a stop 20 on the arm 12, the stop operating in a slot 21 in the staff 1. The stop 20 may be U-shaped in form, and may be made so by bending the arm 12 transversely into the desired contour.

I claim:

1. In a device of the class described, a staff, a fixed jaw comprising cooperating loops the outer side portions of which are formed into a shank which is connected to the staff, the inner side portions of the loops being free and resilient, a second jaw, and means for mounting the second jaw on the staff for movement toward and away from the first jaw.

2. In a device of the class described, a staff, a fixed jaw carried by the staff, a loop-shaped second jaw movable toward and away from the fixed jaw, the second jaw comprising arms extended along the staff, and guiding means on the staff, one arm being slidable in the guiding means, the other arm being in slidable contact with the staff, thereby to steady the second jaw, said other arm being free from the guiding means, thereby to enhance the resiliency of the second jaw.

In testimony that I claim the foregoing as my own, I have hereto affixed my signature.

ARTHUR DE PAEMELAERE.